UNITED STATES PATENT OFFICE.

CHARLES DE LA HARPE AND ERNST BODMER, OF BASEL, SWITZERLAND, ASSIGNORS TO DYE WORKS FORMERLY L. DURAND, HUGUENIN & CO., OF BASEL, SWITZERLAND.

ORANGE-RED TO BLUISH-RED MORDANT DYESTUFFS AND PROCESS OF MAKING SAME.

1,055,885.  Specification of Letters Patent.  Patented Mar. 11, 1913.

No Drawing.  Application filed July 8, 1912. Serial No. 708,238.

*To all whom it may concern:*

Be it known that we, CHARLES DE LA HARPE and ERNST BODMER, both chemists, citizens of the Swiss Republic, and residents of Basel, Switzerland, have invented new Orange-Red to Bluish-Red Mordant Dyestuffs and a Process of Making Same, of which the following is a full, clear, and exact specification.

We have found that new orange-red to bluish red mordant nitro-rhodol dyestuffs are obtained by condensing an amino-meta-oxybenzoylbenzoic acid substituted in the amino group with nitrated resorcin compounds as, for instance, nitroresorcin, nitroresorcinsulfonic acids or the sulfonic acid of nitro-6-resorcylic acid and transforming the product thus obtained into serviceable form by transforming it into an easily soluble alkali metal salt. The new dyestuffs which are thus produced are, like the analogous, not nitrated rhodols, mordant dyestuffs as shown by the difference of their dyeings on not mordanted and mordanted fiber. Their tints on chrome-mordanted fiber vary from orange-red to bluish red. In distinction from the corresponding not nitrated rhodols, the nitro-rhodols dye the fiber more yellowish tints. Certain properties of fastness are favorably affected by the entry of the nitro group, such as the fastness to light of the dyeings with chrome mordants on wool, which is better than that of the corresponding not nitrated rhodols.

The new dyestuffs are brown to red powders, which are easily soluble in water and from these solutions the corresponding acid nitrorhodols are precipitated by adding acid. Some of the not sulfonated nitro-rhodols may be sulfonated for the purpose of increasing their solubility under certain conditions; obviously, those which contain a benzyl or a phenyl residue in the amino-group are particularly easily sulfonated.

The invention is illustrated by the following examples, the parts being by weight:—

Example I: 11 parts of resorcin are dissolved in 120 parts of concentrated sulfuric acid and sulfonated; the mixture is then nitrated to nitro-resorcin-disulfonic acid corresponding probably to the formula

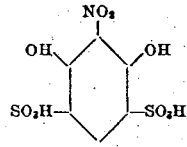

according to the process described in German Patent Specification 145190, with 14.3 parts of a mixture of nitric acid and sulfuric acid containing 44 per cent. of $HNO_3$. Into the mass are stirred 28.5 parts of dimethyl-amino-meta-oxybenzoylbenzoic acid corresponding to the formula

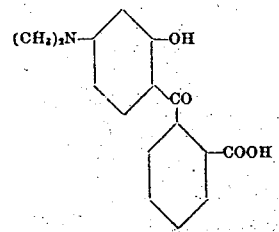

or an equivalent quantity of another N-substitution derivative of amino-meta-oxybenzoylbenzoic acid, and the mixture, as homogeneous as possible, is heated at 90° until no further increase of dyestuff formation can be observed. The cooled mass is poured into ice-water. The dyestuff separates in flocks; it is filtered and pressed. By means of sodium acetate solution it can be dissolved away from impurities which may be present. From the filtered solution the dyestuff is precipitated by acid, filtered and converted in usual manner into an easily soluble alkali metal salt. The dyestuff dyes chrome-mordanted fibers orange red tints. The tint is much more yellowish than that of the analogous dyestuff from the not nitrated resorcin disulfonic acid described in the United States Letters Patent No. 1002825 dated September 12, 1911. The dyestuff dissolves in concentrated sulfuric acid with a citron yellow coloration turning to yellowish red on addition of water. In dilute alkalis it dissolves to yellowish rose solution of green fluorescence. It corresponds probably to the formula

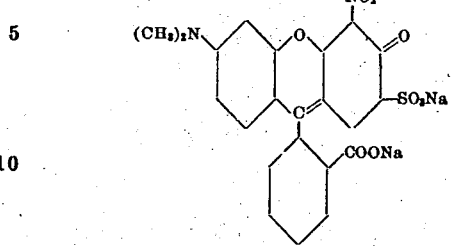

Example II: Into a solution of the sulfonic acid of β-resorcylic acid made from 16 parts of β-resorcylic acid and 64 parts of sulfuric acid monohydrate, are introduced gradually while stirring well and cooling, 18 parts of a mixture of nitric acid and sulfuric acid containing 35 per cent. $HNO_3$, corresponding with 6.3 parts of nitric acid. The whole is allowed to stand for a long time at the ordinary temperature and finally heated for a short time at 70°. After it has been ascertained that free nitric acid is no longer present there are stirred into the cooled mass 28.5 parts of dimethylamino-meta-oxybenzoylbenzoic acid corresponding to the formula

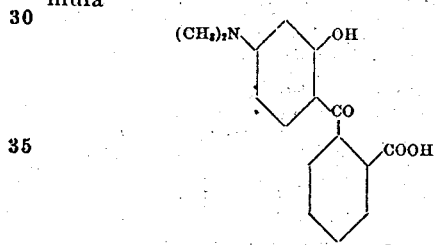

and the mixture, as homogeneous as possible, is heated at 90° until no further increase of the dyestuff formation can be observed. The product is worked up as usual by pouring into ice-water, filtering and pressing the dyestuff, dissolving away the latter from by-products by means of sodium acetate solution, transforming the dyestuff which has been re-precipitated by acid into a soluble form by dissolving in alkali and salting out.

The dyestuff dyes unmordanted wool bright red and chrome mordanted wool bluish-red tints. In concentrated sulfuric acid it dissolves to yellow solutions turning to yellowish red on addition of water. In dilute alkalis it dissolves to a rose solution of green fluorescence. It corresponds probably to the formula

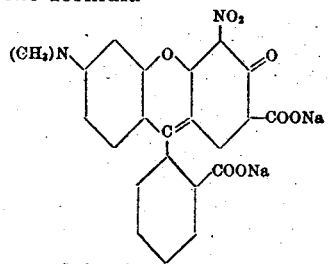

What we claim is:
1. The described process for the manufacture of orange-red to bluish-red mordant dyestuffs, which consists in condensing an amino-m-oxybenzoylbenzoic acid substituted in the amino group with a nitrated resorcin compound and transforming the condensation product thus obtained into an alkali salt.

2. The described process for the manufacture of orange-red to bluish-red mordant dyestuffs, which consists in condensing an alkylamino-m-oxybenzoylbenzoic acid with a nitrated resorcin compound and transforming the condensation product thus obtained into an alkali salt.

3. The described process for the manufacture of orange-red to bluish-red mordant dyestuffs, which consists in condensing a dialkylamino-m-oxybenzoylbenzoic acid with a nitrated resorcin compound and transforming the condensation product thus obtained into an alkali salt.

4. As new products the described nitrorhodol dyestuffs, being alkali metal salts of the condensation products of a nitrated resorcin compound with an amino-meta-oxybenzoylbenzoic acid substituted in the amino group and constituting in dry state brown to red powders easily soluble in water, soluble in concentrated sulfuric acid with yellow coloration turning to yellowish red on addition of water, dissolving in dilute alkalis to yellowish rose to rose solutions of green fluorescence and dyeing chrome mordanted fibers orange red to bluish red tints.

In witness whereof we have hereunto signed our names this 24th day of June 1912, in the presence of two subscribing witnesses.

CHARLES DE LA HARPE.
ERNST BODMER.

Witnesses:
GEO. GIFFORD,
ARMAND RITTER.